US010546354B2

(12) United States Patent
Song et al.

(10) Patent No.: US 10,546,354 B2
(45) Date of Patent: Jan. 28, 2020

(54) GENERIC SOCIAL MEDIA PLATFORMS ADAPTER

(71) Applicant: SAP SE, Walldorf (DE)

(72) Inventors: Yixiao Song, Fremont, CA (US); Vinod Srinivasan, Palo Alto, CA (US); Kamalakannan Hari Krishna Moorthy, Tempe, AZ (US)

(73) Assignee: SAP SE, Walldorf (DE)

( * ) Notice: Subject to any disclaimer, the term of this patent is extended or adjusted under 35 U.S.C. 154(b) by 214 days.

(21) Appl. No.: 15/640,678

(22) Filed: Jul. 3, 2017

(65) Prior Publication Data
US 2019/0005593 A1    Jan. 3, 2019

(51) Int. Cl.
*G06F 15/16* (2006.01)
*G06Q 50/00* (2012.01)
*G06N 5/02* (2006.01)
*H04L 29/08* (2006.01)

(52) U.S. Cl.
CPC ............ *G06Q 50/01* (2013.01); *G06N 5/022* (2013.01); *H04L 67/22* (2013.01); *H04L 67/02* (2013.01)

(58) Field of Classification Search
CPC .............................. H04L 67/22; G06Q 50/01
USPC .................. 709/202–203, 217–219
See application file for complete search history.

(56) References Cited

U.S. PATENT DOCUMENTS

| | | | | |
|---|---|---|---|---|
| 2011/0125793 A1* | 5/2011 | Erhart | ................... | G06Q 50/01 709/206 |
| 2011/0270649 A1* | 11/2011 | Kerho | ................... | G06Q 30/00 705/7.31 |
| 2015/0193774 A1* | 7/2015 | Wetzel | ................... | G06Q 50/01 705/44 |
| 2016/0048842 A1* | 2/2016 | Trivedi | ................ | G06O 30/016 705/304 |
| 2017/0220926 A1* | 8/2017 | Chhabra | ................ | G06Q 50/01 |

* cited by examiner

*Primary Examiner* — Bharat Barot
(74) *Attorney, Agent, or Firm* — Klarquist Sparkman, LLP

(57) ABSTRACT

A system for extracting social media activity data from diverse application programming interfaces of diverse social media platforms includes a memory and a semiconductor-based processor coupled to form logic circuits. The logic circuits generate a generic adapter framework for the system. The system includes a Java application server, a generic adapter acting as a common interface between the diverse application programming interfaces of the diverse social media platforms and an application that consumes the social media activity data, and a controller that supervises the generic adapter to send requests for data to, and to receive data from, the diverse application programming interfaces (APIs) of the diverse social media platforms.

20 Claims, 3 Drawing Sheets

GENERIC SOCIAL MEDIA PLATFORMS ADAPTER

BACKGROUND

Social network analysis is now used in diverse fields (e.g., data aggregation and mining, network propagation modeling, network modeling and sampling, user attribute and behavior analysis, community-maintained resource support, location-based interaction analysis, social sharing and filtering, recommender systems development, etc. In the private sector, businesses may use social network analysis to support activities such as customer interaction and analysis, information system development analysis, marketing, and business intelligence needs, etc. In the public sector, organizations may use social network analysis to support activities such as development of leader engagement strategies, analysis of individual and group engagement and media use, and community-based problem solving, etc.

Consideration is now being given to systems and methods for collecting social media activity information from diverse social media platforms.

SUMMARY

A system for extracting social media activity data from diverse application programming interfaces (APIs) of diverse social media platforms is disclosed herein. The system includes a memory and a semiconductor-based processor that form logic circuits providing a generic adapter framework to the system. Forming the logic circuits may involve the processor executing instructions stored in the memory.

In an aspect, the system includes an application server (e.g., a Java application server) and a generic adapter. The generic adapter acts as a common interface between the diverse APIs of the diverse social media platforms and an application that consumes the social media activity data. The system further includes a controller configured to instruct the generic adapter to send requests for data to, and to receive data from, the diverse application programming interfaces (APIs) of the diverse social media platforms.

In an aspect, the generic adapter includes one or more adapter workers that allow concurrency of execution of tasks under the supervision of the controller.

In an aspect, a task identifies a target social media platform and describes the social media activity data needed from the target social media platform. The system includes a request generator that generates a request for data described in the task. The request for data conforms to a protocol of the API of the target social media platform.

In an aspect, the request generator generates a HTTP request that includes one or more of a method type, a request header, a request payload, a request URL, a volume, a universally unique identifier (UUID), task information, a parser URL, and parser authentication information.

In an aspect, the request generator places the generated request for data in a request queue, and the one or more adapter workers in the generic adapter execute requests in the request queue asynchronously or in parallel.

In an aspect, the system further includes a parser associated with the API of the target social media platform. The parser converts the value of one data type in the data received from the target social media platform to a value of another data type to match the format of data in a database.

In an aspect, the parser uses XSJS that operates at the database I/O layer, and maps the received data into a corresponding table in the database according to a mapping rule.

In an aspect, the parser uses Java Database Connectivity (JDBC) to access the database, and flattens the received data in JavaScript Object Notation (JSON) from the API of the target social media platform and saves the data in the database.

In an aspect, the system provides a data streaming service supplying data from one or more of the social media platforms to a customer's social media analytics application via an intermediate data store.

In an aspect, the system includes a heartbeat monitor, which provides a health check of adapter workers in the generic adapter.

The details of one or more implementations are set forth in the accompanying drawings and the description below. Further features of the disclosed subject matter, its nature and various advantages will be more apparent from the accompanying drawings, the following detailed description, and the appended claims.

DETAILED DESCRIPTION

Figure 1:
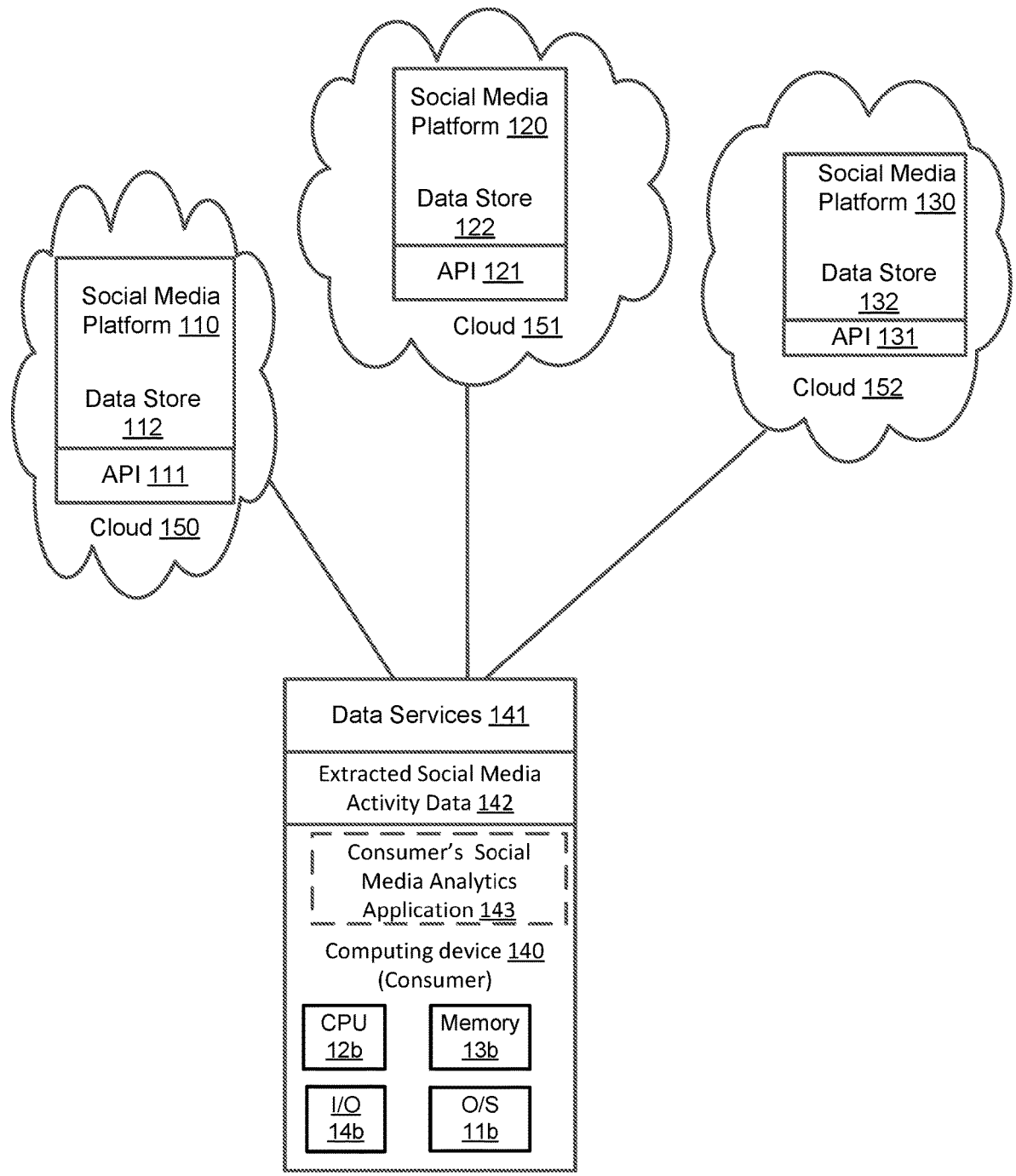
FIG. 1 is a schematic block diagram illustration of an example cloud-based system in which several social media platforms can share social media activity data with customers via respective custom Application Programming Interfaces (APIs), in accordance with the principles of the present disclosure.

For convenience in description, the terms "social media," "social media network," "social media websites," "social media platform," or "social media channel" may be used interchangeably herein.

Social media (e.g., Twitter, Facebook, Snapchat, WeChat, etc.) has created channels of two way communications between organizations (e.g., for-profit business entities, non-profit organizations, governmental entities, etc.) and individuals in communities at large that never existed before. With the ubiquitous use of social media in present day society, perceptions and views of the social media networking community may be a good representation of the perceptions and views of the society at large.

An organization may incorrectly assume that consumers and clients see inbound social media on a topic (e.g., a website, e-mail or other communication) from the same perspective as the perspective of the organization. A "social quotient or "social "intelligence" concept may be used to refer to the level of awareness and understanding that the organization possesses as it relates to social interaction with, and between, customers and clients, especially online. With a better social quotient or intelligence, the organization is likely to be more adept towards change, and more likely to be successful in its interactions with customers and clients.

Toward a better social quotient or intelligence, social media analytics is the practice of gathering data from blogs and social media platforms (e.g., Twitter, Facebook, Snapchat, WeChat, etc.) and analyzing that data. A common use of social media analytics is to mine customer or client sentiment in order to support marketing and customer service activities of an organization (e.g., a business, or a non-profit organization). There is a need for an organization (e.g., retail, fashion, or public services) to gather the social quotient or intelligence for a given topic, and even analyze social media information to determine possible trending topics in real-time.

Over time, several social media platforms or channels have evolved for specific topics or purposes. The following is a list of example social media platforms that may be presently available to users on the Internet for specific topics or purposes:

Social networking sites—Facebook, Google Plus, CafeMom, Gather, Fitsugar, LinkedIn for business professionals, etc.

Micro-blogging sites—Twitter, Tumblr, Posterous, etc.

Publishing tools—WordPress, Blogger, Squarespace, etc.

Collaboration tools—Wikipedia, WikiTravel, WikiBooks, etc.

Rating/Review sites—Amazon ratings, Angie's List, etc.

Photo sharing sites—Flikr, Instagram, Pinterest, etc.

Video sharing sites—YouTube, Vimeo, Viddler, etc.

Personal broadcasting tools—Blog Talk radio, Ustream, Livestream, etc.

Virtual worlds—Second Life, World of Warcraft, Farmville, etc.

Location based services—Check-ins, Facebook Places, Foursquare, Yelp, etc.

Widgets—Profile badges, Like buttons, etc.

Social bookmarking and news aggregation—Digg, Delicious, etc.

Group buying—Groupon, Living Social, Crowdsavings, etc.

and

Crowd-sourced reviews—Yelp, Amazon, etc.

It will be understood that number of social media platforms that may be available to users is large. The number of social media platforms is not limited to the few examples included in the foregoing list, which is shown only for purposes of illustration. Other social media platforms may be currently available to users, and yet other new social media platforms may become available to users over time.

The large number of social media platforms may be hosted in one or more cloud-based environments. Each of the social media platforms may collect social media activity information (e.g., number of clicks on a company's website, mentions of a topic or product brand, mentions of competitors or industry thought leaders, demographics and geolocations of users, twitter feeds, metrics about a user's posts and the engagement they earn, etc).

A social media platform may make some or all of its collected social media activity data available to customers (e.g., individuals as well as businesses). The customers may use the social media activity data, for example, for social media analytics for their interests and purposes. Each of the social media platforms may have its own custom means and methods (e.g., Application Programming Interface (APIs)) to share the social media activity data with customers.

FIG. 1 schematically shows an example cloud-based system 100 in which several social media platforms can share social media activity data with customers via respective custom APIs.

Cloud-based system 100 may, for example, include several social media platforms (e.g., social media platforms 110, 120, 130, etc.) that are hosted, for example, on respective networks or clouds (e.g., cloud 150, cloud 151 and cloud 152, respectively). The social media platforms may monitor social media activity on the respective platforms and store such data in respective platform databases (e.g., data store 112, data store 122 and data store 132). The social media platforms (e.g., social media platforms 110, 120, 130, etc.) may make processed or raw social media activity data available to a customer's computing device 140 via respective custom social media platform APIs (e.g., API 111, API 121, API 131, etc.).

A customer may have accounts on several social media platforms (e.g., social media platforms 110, 120, 130, etc.). The customer may use a social media analytics application (e.g., social media analytics application 143) to analyze social media activity data (social media activity data 142). The customer's social media analytics application 143 may be hosted on one or more computers (e.g., a computing device 140, which includes OS 11b, CPU 12b, memory 13b and I/O 14b, etc.). The customer may employ data services 141 (e.g., Informatica, SAP Data Services, Cognos, Data Stage, or SQL Server Integration Services (SSIS), etc.) to sequentially request and receive (or extract) social media activity data 142 from each of the several social media platforms via the respective custom social media platform APIs (e.g., API 111, API 121, API 131, etc.). The extracted social media activity data 142 may, for example, relate to a topic (e.g., web presence, mentions of a brand or competitors, etc.) of interest to the customer.

It may be noted that in system 100, data services 141 (e.g., Informatica, SAP Data Services, Cognos, Data Stage, SQL Server Integration Services (SSIS) etc.) retrieve data (e.g., extracted social media activity data 142) from predefined sources (e.g., social media platforms 110, 120, 130, etc.) via respective source APIs (e.g., API 111, API 121, API 131, etc.). Data services 141 may include data extraction routines that have to be customized to match the specifications of each of the respective custom APIs of the social media platforms.

The number and type of social media platforms (and APIs) in system 100 is likely to change continuously with time (e.g., as more and more social media platforms become available with time, or as the customer's participation in diverse social media platforms increases). Further, even with the existing social media platforms that are now available, the respective custom API specifications can change from time to time. Thus, data services 141 may have to be continuously re-coded, reconfigured or upgraded to extract social media activity data 142 from an increasing or changing set of social media platforms/APIs. Thus, data services 141 may cumbersome to maintain.

Further, in typical situations, data services 141, which may only sequentially execute data requests to the several social media platform APIs one-by-one, can be slow in terms of performance and may not allow real-time extraction or real-time monitoring of social media information or topics.

In contrast to the typical data services (e.g., data services 141), the systems and methods described herein involve a generic adapter that acts a common interface between the diverse social media platform APIs and any application that monitors or consumes social media activity information, in accordance with the principles of the present disclosure.

The generic adapter disclosed herein may provide a common interface that enables an application to seek information on a selected topic (e.g., a name, a product or company brand, competitors, an event, etc.) from any of a plurality of diverse social media platforms. The generic adapter may be configured to support real-time extraction, transformation and loading ("ETL")) social media activity information from the plurality of diverse social media platforms in parallel. Further, the generic adapter may support scale out as a distributed solution to optimize performance based on number of requests, hardware configuration and network latency. The structure of the generic adapter may have extensibility to add more social media platforms from which social media activity information can be extracted.

Figure 2:
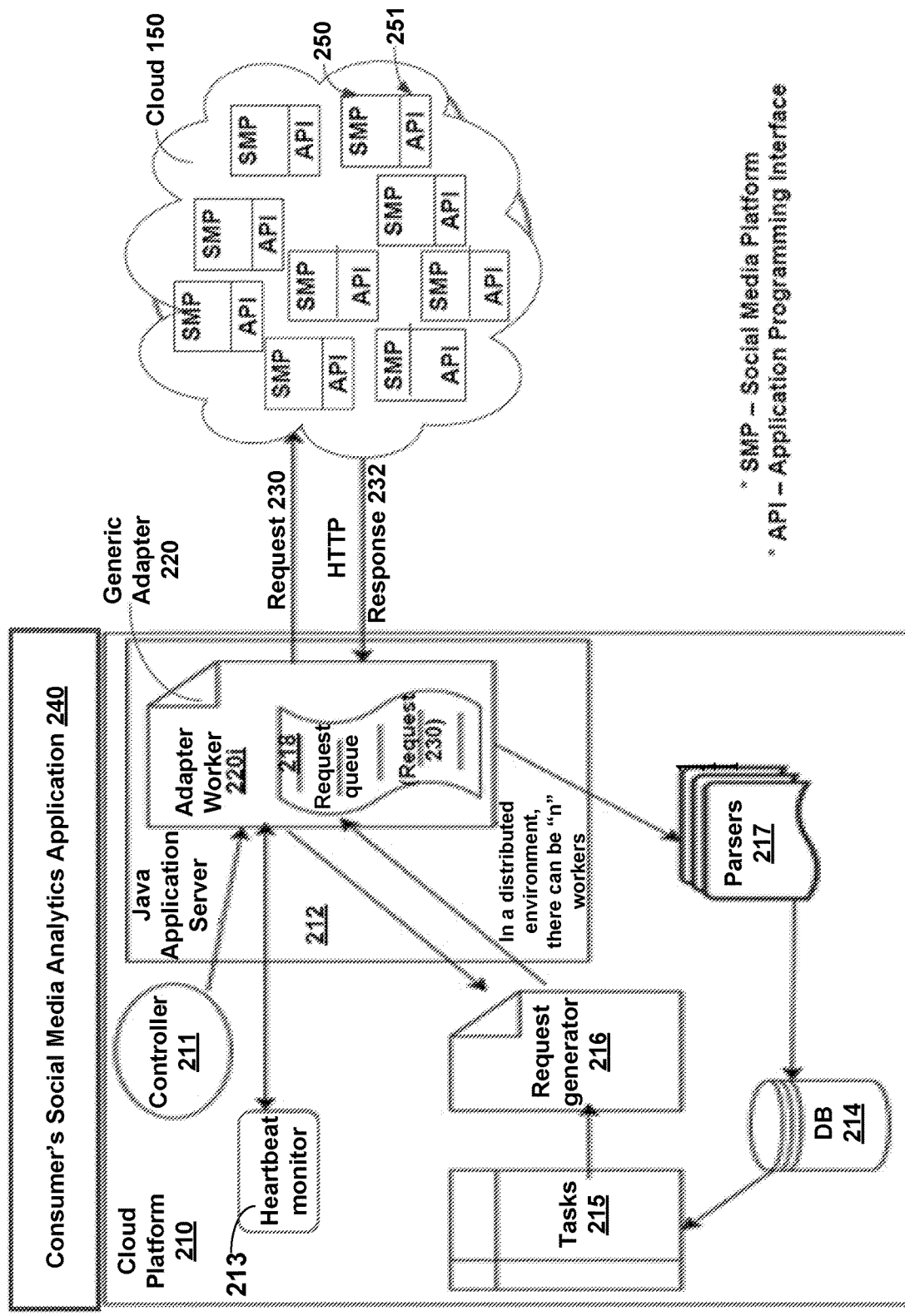
FIG. 2 is a schematic block diagram illustration of example system that retrieves or extracts social media activity information from diverse social media platforms under a "generic adapter framework," in accordance with the principles of the present disclosure.

FIG. 2 shows an example system 200 that retrieves or extracts social media activity information from diverse social media platforms under a "generic adapter framework," in accordance with the principles of the present disclosure. System 200 involves using a generic adapter as a common interface to diverse APIs (e.g., APIs 251) of the diverse social media platforms (e.g., social media platforms 250).

System 200 may be hosted on one or more physical or virtual machines (e.g., computing device 140). In the example shown in FIG. 2, system 200 is supported on a cloud computing platform (e.g., cloud platform 210). System 200 may be implemented using, for example, Java, JavaScript, or other programming languages. System 200 may include an application server (e.g., Java application server 212) that provides both facilities to create web applications and a server environment to run them.

The diverse social media platforms (e.g., social media platforms 250), which may be operating in respective individual clouds (e.g., cloud 150) may have respective custom APIs (e.g., APIs 251), which may be public. The respective individual clouds, which host the diverse social media platforms, may include one or more distinct non-overlapping clouds, or may include one or more overlapping clouds. For visual clarity and convenience in description, the respective individual clouds are shown in FIG. 2 collectively as a single cloud 150.

APIs 251 configured to receive requests for data (e.g., HTML requests, request 230). Each API 251 may have a respective format for a proper data request. A properly formatted data request may include the customer's security credentials, and specification of the requested information (e.g., search terms, language, number of mentions, date or time ranges, number of tweets, etc.). Further, API 251 may have processes for authentication and verification of the security credentials of the customer to determine if the customer has permission to access social media platform activity data. Upon verification of the security credentials of the customer submitting a data request, API 251 may return information (e.g., as a HTTP response, response 232). Response 232 may include information that is limited to the information that the customer has permission to access.

The returned information may be parsed (e.g., by resource parser 217) and stored, for example, in a database (e.g., database 214), which may be accessible to the customer (e.g., Social Media Analytics Application 240). Each of the APIs 251 may have a respective resource parser 217 associated with it.

In an example implementation (shown in FIG. 2), system 200 includes a controller 211, a request generator 216, a generic adapter 220 (including, for example, one or more adapter workers 220i), one or more resource parsers 217, a heartbeat monitor 213, and a data repository or database 214.

In example implementations, generic adapter 220/adapter workers 220i may be implemented, for example, in Java. Controller 211, request generator 216, and resource parsers 217 may be implemented, for example, in JavaScript (e.g., SAP XS JavaScript (XSJS)). Resource parsers 217 may be additionally or alternatively implemented using a JavaSoft specification (e.g., JDBC) of a standard application programming interface (API) that allows Java programs to access database management systems (e.g., database 214).

Java Application Server 212 may be configured to provide a "generic adapter" data streaming service (e.g., a Java service) to a customer's social media analytics application (e.g., Social Media Analytics Application 140 hosted on cloud platform 210, or Social Media Analytics Application 143 hosted on computing device 140). The customer may define tasks (e.g., tasks 215) for data retrieval from one or more of the social media platforms (e.g., social media platforms 250). Tasks 215 may be stored (e.g., in tables) in a database (e.g., database 214).

Tasks 215 may, for example, include tasks for retrieving data from specific websites of target social media platforms 250. Example tasks 215 may include tasks such as retrieve the last 1000 tweets from Twitter; retrieve data on brand name mentions from Google, etc.

In system 200, request generator 216 may be configured to generate HTTP requests (e.g., request 230) for data from the target social media platforms. The requests may correspond to, for example, the tasks (e.g., tasks 215) defined by the customer. Request generator 216 may include, in each HTTP request, information according to the protocol or requirements of the custom APIs of the target social media platforms 250. The information included in the HTTP request may, for example, include one or more of a method type (e.g., GET, POST, PUT, etc.) conforming to a protocol of the target social media platform website), a request header, a request payload, a request URL, a volume, a universally unique identifier (UUID), task information, a parser URL (for adapter processing), and parser authentication information, etc. The generated HTTP requests (e.g., request 230) may be placed in a request queue (e.g., Request Queue 218) for execution by generic adapter 220/adapter worker 220i.

In system 200, generic adapter 220, which may be implemented in Java, may be hosted on Java Application Server 212. In a distributed cloud environment, generic adapter 220 may include several (e.g., "n") adapter worker 220i. Adapter worker 220i may be a thread pool that allows concurrency of execution of tasks (i.e. task parallelism) under the supervision of controller 211. Healthbeat monitor 213 may negotiate and monitor the health and availability of adapter worker 220i.

In example implementations, generic adapter 220/adapter workers 220i may be configured to submit properly formatted data requests (e.g., HTTP request 230 from Request Queue 218) to the target social media platforms (e.g., social media platform 250) websites via APIs 251 to pull information (e.g., HTTP response 232) from the target social media platforms. Generic adapter 220/adapter worker 220i may submit the properly formatted data requests to the target social media platforms asynchronously or in parallel. Generic adapter 220/adapter worker 220i may be configured to run continuously, and may constantly pull information in (or from) repository (e.g. database 214, and social media platforms 250).

In system 200, controller 211 may control adapter worker 220i by providing the adapter worker with information about request generator 216 and the requests (e.g., request 230) including, for example, URLs (e.g., website Facebook), authentication information, sleep time, identification of a one-time request, a heartbeat health check (adapter, e.g., load on adapter), destination URL and its authentication information.

Adapter worker 220i may read requests (e.g., request 230) that are generated by request generator 216 (and listed in request queue 218), and make parallel requests to the target social media platforms (e.g., social media platform 250) via APIs 251 by using a multithreading feature of Java. On receiving a response (e.g., response 232) from a social media platform API, adapter worker 220i may send the received data to a respective parser (e.g., parser 217) corresponding to the API. Parser 217 may convert the value of one data type in the response to a value of another data type, for example, to match the format of data in database 214.

In an example implementation, parser 217 may use XSJS that operates at the database I/O layer. Such a parser 217 may read a mapping rule and map the received data into a corresponding table or tables in database 214.

In another example implementation, parser 217 may use Java Database Connectivity (JDBC) to access a database (e.g., database 214) or use Event Stream Processing (ESP) service, which may be available, for example, in SAP Cloud Platform. Such a parser 217 may flatten the received data (e.g., API response 232), which may be in JavaScript Object Notation (JSON), and save the data in tables in database 214 along with task information (as one of the table keys). Flattening the received JSON data may provide a high compression of the data for storage.

On receiving new instructions from controller 211, adapter worker 220i may overwrite the current result settings (except for the one-time requests that are, for example, marked true) in request queue 218 and database 214. In addition, controller 211 may send health check requests to the heartbeat monitor 213 for health status information (e.g., ping, last run time, request result, availability, etc.) of adapter worker 220i. Controller 211 may be configured to automatically optimize system performance as a whole based on the health status of each adapter worker 220i the system.

In example implementations, system 200/generic adapter 220 may be configured to provide a "generic adapter" streaming service (for data retrieved from diverse social media platforms in the cloud) by subscription to the customer. The "generic adapter" streaming service may pull data from social media channels in real-time or near real-time, and ingest the data into, for example, database 214. The customer can then consume the data ingested into database 214 using, for example, the customer's on premise application (e.g., Social Media Analytics Application 143), or the customer's cloud application (e.g., Social Media Analytics Application 240).

System 200 operating under the generic adapter framework can parallelize data requests and stream in social media platform data in real-time or near real-time.

Adding new social media platforms to the set of social media platforms from which system 200 extracts data may involve modification of only the request generator (e.g., request generator 216) to generate data requests directed to the new social media platforms. By leveraging user interface layer features for automatic code generation, minimum development effort may be needed for the modification.

In an aspect, by avoiding directly outbound connections to social media APIs from server side, implementations of system 200 may make the enterprise environment safer and secure.

Figure 3:
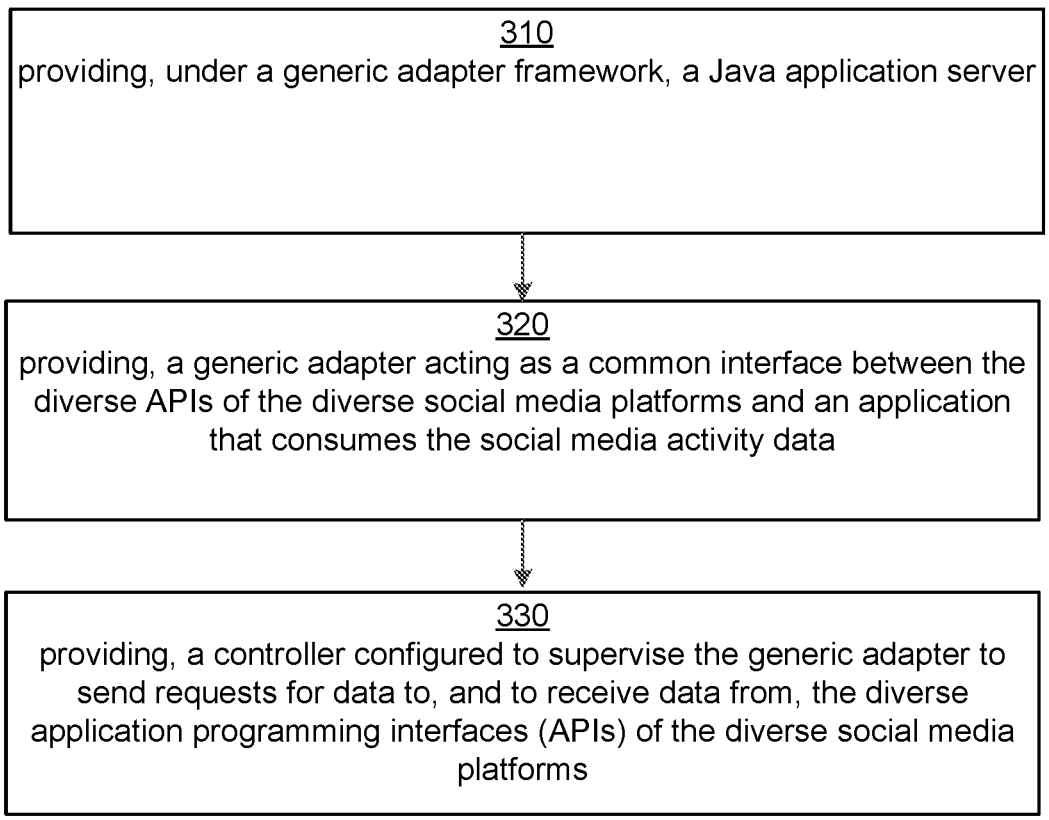
FIG. 3 is an illustration of an example method for extracting social media activity data from diverse application programming interfaces (APIs) of diverse social media platforms, in accordance with the principles of the present disclosure.

FIG. 3 shows an example method 300 for extracting social media activity data from diverse application programming interfaces (APIs) of diverse social media platforms, in accordance with the principles of the present disclosure.

Method 300 includes providing, under a generic adapter framework, a Java application server (310), and providing, a generic adapter acting as a common interface between the diverse APIs of the diverse social media platforms and an application that consumes the social media activity data (320). The generic adapter includes one or more adapter workers that allow concurrency of execution of tasks under the supervision of a controller.

Method 300 further includes providing, a controller configured to supervise the generic adapter to send requests for data to, and to receive data from, the diverse application programming interfaces (APIs) of the diverse social media platforms (330).

In implementations of method 300, a task identifies a target social media platform and describes the social media activity data needed from the target social media platform. Method 300 further includes providing a request generator configured to generate a request for data described in the task. The generated request for data conforms to the protocol of the API of the target social media platform. The generated request for data may be HTTP request that includes one or more of a method type, a request header, a request payload, a request URL, a volume, a universally unique identifier (UUID), task information, a parser URL, and parser authentication information.

In example implementations of method 300, the request generator places the generated request for data in a request queue, and one or more adapter workers are configured to execute requests in the request queue asynchronously or in parallel.

In example implementations, method 300 also includes providing a parser associated with the API of the target social media platform. The parser converts the value of one data type in the data received from the target social media platform to a value of another data type to match the format of data in a database.

In one implementation, the parser uses Java Database Connectivity (JDBC) to access the database, and flattens the received data in JavaScript Object Notation (JSON) from the API of the target social media platform and saves the data in the database.

In another implementation, the parser uses XSJS that operates at the database I/O layer, and maps the received data into a corresponding table in the database according to a mapping rule.

In some implementations method 300 includes providing a data streaming service supplying data from one or more of the social media platforms to a customer's social media analytics application. The data streaming service may supply the data to an intermediate database wherefrom the data may be consumed by the customer's social media analytics application.

Method 300 may additionally include providing a heartbeat monitor configured to provide a health check of adapter workers in the generic adapter.

The various systems and techniques described herein may be implemented in digital electronic circuitry, or in computer hardware, firmware, or in combinations of thereof. The various techniques may implemented as a computer program product, i.e., a computer program tangibly embodied in a non-transitory machine readable storage device, for execution by, or to control the operation of, data processing apparatus, e.g., a programmable processor, a computer, or multiple computers.

Method steps may be performed by one or more programmable processors executing a computer program. Method steps also may be performed by, and an apparatus may be implemented as, logic circuitry or special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Components of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for extracting social media activity data from diverse application programming interfaces (APIs) of diverse social media platforms, the system including a memory and a semiconductor-based processor forming one or more logic circuits generating generic adapter framework for the system, the system comprising:
    a Java application server;
    a generic adapter hosted on the Java application server and configured to execute tasks, the generic adapter acting as a common interface between the diverse APIs of the diverse social media platforms and an application that consumes the social media activity data, wherein the respective tasks identify a target social media platform and describe the social media activity data needed from the target social media platform;
    a request generator configured to generate requests for the social media activity data described in the respective tasks, wherein the request for the social media activity data described in a given task conforms to a protocol of the API of the target social media platform identified in the task; and
    a controller configured to instruct the generic adapter to send the requests for the social media activity data to, and to receive the social media activity data from, the diverse APIs of the diverse social media platforms.

2. The system of claim 1, wherein the generic adapter includes one or more adapter workers that allow concurrency of execution of the tasks under supervision of the controller.

3. The system of claim 1, wherein the requests for the social media activity data generated by the request generator comprise HTTP requests that each include one or more of a method type, a request header, a request payload, a request URL, a volume, a universally unique identifier (UUID), task information, a parser URL, and parser authentication information.

4. The system of claim 1, wherein the request generator is configured to place the requests for the social media activity data in a request queue, and wherein one or more adapter workers of the generic adapter are configured to execute the requests for the social media activity data in the request queue asynchronously or in parallel.

5. The system of claim 4, further comprising a parser associated with the API of the target social media platform, the parser configured to convert a value of one data type in the social media activity data received from the target social media platform to a value of another data type to match the format of data in a database.

6. The system of claim 5, wherein the parser uses XSJS that operates at the I/O layer of the database, and wherein the parser maps the received social media activity data into a corresponding table in the database according to a mapping rule.

7. The system of claim 5, wherein the parser uses Java Database Connectivity (JDBC) to access the database, and wherein the parser flattens the received social media activity data in JavaScript Object Notation (JSON) from the API of the target social media platform and saves the flattened social media activity data in the database.

8. The system of claim 1 further configured to provide a data streaming service supplying data from one or more of the social media platforms to a customer's social media analytics application via an intermediate data store.

9. The system of claim 1 further comprising a heartbeat monitor configured to provide a health check of adapter workers in the generic adapter.

10. The system of claim 1, wherein the generic adapter includes a thread pool that allows concurrency of execution of the tasks under supervision of the controller.

11. A method for extracting social media activity data from diverse application programming interfaces (APIs) of diverse social media platforms, the method comprising:
- providing, under a generic adapter framework, a Java application server;
- providing, a generic adapter acting as a common interface between the diverse APIs of the diverse social media platforms and an application that consumes the social media activity data; and
- providing, a controller configured to supervise the generic adapter to send requests for data to, and to receive data from, the diverse application programming interfaces (APIs) of the diverse social media platforms,
- wherein the generic adapter includes one or more adapter workers that allow concurrency of execution of tasks under the supervision of the controller, and
- wherein a task identifies a target social media platform and describes the social media activity data needed from the target social media platform, the method further comprising:
- providing a request generator configured to generate a request for data described in the task, the request for data conforming to a protocol of the API of the target social media platform.

12. The method of claim 11, wherein the requests for data generated by the request generator comprise HTTP requests that each include one or more of a method type, a request header, a request payload, a request URL, a volume, a universally unique identifier (UUID), task information, a parser URL, and parser authentication information.

13. The method of claim 11, wherein the request generator is configured to place the generated request for data in a request queue, and wherein the one or more adapter workers are configured to execute requests in the request queue asynchronously or in parallel.

14. The method of claim 13 further comprising:
- providing a parser associated with the API of the target social media platform, the parser configured to convert a value of one data type in the data received from the target social media platform to a value of another data type to match the format of data in a database.

15. The method of claim 14 wherein the parser uses Java Database Connectivity (JDBC) to access the database, and wherein the parser flattens the received data in JavaScript Object Notation (JSON) from the API of the target social media platform and saves the data in the database.

16. The method of claim 14, wherein the parser uses XSJS that operates at the I/O layer of the database, and wherein the parser maps the received data into a corresponding table in the database according to a mapping rule.

17. The method of claim 11 further comprising:
- providing a data streaming service supplying data from one or more of the social media platforms to a customer's social media analytics application via an intermediate data store.

18. The method of claim 11 further comprising:
- providing a heartbeat monitor configured to provide a health check of adapter workers in the generic adapter.

19. The method of claim 11, wherein the respective adapter workers are configured to read the requests for data generated by the request generator and make parallel requests to the target social media platforms by using a multithreading feature.

20. A system for extracting data from diverse application programming interfaces (APIs) of diverse social media platforms, the system including a memory and a semiconductor-based processor forming one or more logic circuits generating generic adapter framework for the system, the system comprising:
- an application server;
- a generic adapter hosted on the application server and configured to execute tasks, the generic adapter acting as a common interface between the diverse APIs of the diverse social media platforms and an application that consumes the data, wherein the respective tasks identify a target social media platform and describe the data needed from the target social media platform;
- a request generator configured to generate requests for the data described in the respective tasks, wherein the request for the data described in a given task conforms to a protocol of the API of the target social media platform identified in the task;
- a controller configured to instruct the generic adapter to send the requests for the data to, and to receive the data from, the diverse APIs of the diverse social media platforms, wherein the generic adapter includes a thread pool that allows concurrency of execution of tasks under supervision of the controller; and
- a thread pool of the generic adapter, the thread pool configured to concurrently execute the tasks under the supervision of the controller.

* * * * *